Nov. 22, 1955 E. T. CHRISTIANSSON 2,724,579

HEATING, COOLING, AND VENTILATING APPARATUS FOR SHIP CABINS

Filed Feb. 9, 1950

INVENTOR.

E. T. Christiansson

BY

Glascock Downing Seebold

ATTYS.

United States Patent Office 2,724,579

Patented Nov. 22, 1955

1

2,724,579

HEATING, COOLING, AND VENTILATING APPARATUS FOR SHIP CABINS

Eric Theodor Christiansson, Goteborg, Sweden, assignor to Aktiebolaget Svenska Flaktfabriken, Stockholm, Sweden Application February 9, 1950, Serial No. 143,240

Claims priority, application Sweden February 17, 1949

1 Claim. (Cl. 257—9)

This invention relates to certain novel improvements in ventilation plants for ship cabins.

The main object of my invention is to provide such a ventilation plant for ship cabins that the hitherto used troublesome air ducts may be dispensed with.

Another object of my invention is to provide such a ventilation plant for ship cabins that the temperature of the air may be varied in a simple and effective way.

A further object of my invention is to provide such a ventilation plant for ship cabins that the installation of the plant will in no way be cumbersome for other installations or fittings when the ship is being built.

Other objects will appear hereinafter.

The invention essentially consists in a number of ship cabins, each provided with a complete ventilation device combined with a fresh air opening in the cabin and containing a radiator to be fed alternately with heating and cooling fluids from a central power plant through a common circulation piping, this being the sole connection between the cabins and said power plant.

The invention will be best understood by reference to the accompanying drawing, in which.

Figures 1, 2, 3, 4, 5:
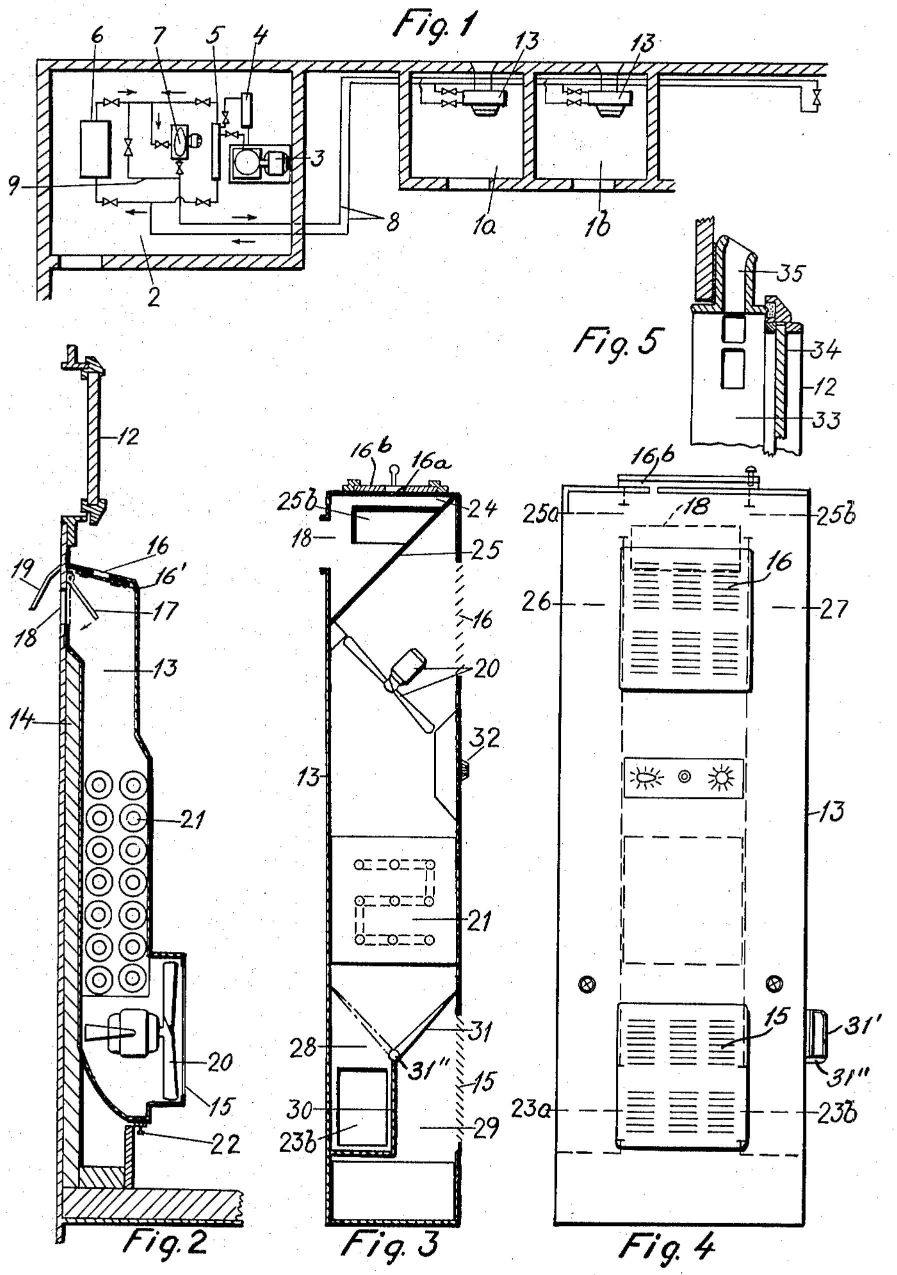
Fig. 1 is a diagram showing a plant according to the invention.
Fig. 2 is a vertical section through a cabin installation of one embodiment of the invention.
Fig. 3 is a vertical section through a cabin installation of another embodiment.
Fig. 4 is a front view of the cabin installation shown in Fig. 3.
Fig. 5 is a section through a portion of a cabin window.

The plant on a ship comprises according to the invention complete ventilation assembly installed in all cabins in combination with a central power installation 2 as a common source for distribution of heating and cooling fluids to the cabins 1*a*, 1*b*. Besides other machines not shown the power installation comprises a refrigerator 3 with condenser 4 and water cooler 5 as well as a hot water boiler 6, the cooler 5 and the boiler 6 being connected to a common pump 7 with pipings and shut-off valves arranged so that the cooler 5 and the boiler 6 can be alternatively connected with the pump 7. The pump 7 has for a suitable number of cabins common circulation piping 8.

A branch 9 of the piping 8 by-passes the pump 7 so that a steam boiler can be substituted for the hot water boiler 6 when it is preferred to use steam instead of warm water for the heating of the cabins. The plant can be such that it comprises a hot water boiler as well as a steam boiler or only one of them.

Each cabin is provided with a complete assembly for ventilating, heating and cooling air in the cabin, which is installed in the cabin and preferably also in combination with natural ventilation through the normal window or porthole of the cabin or through any convenient fresh air opening in said cabin. The assembly consists of a vertical oblong casing 13 near the outer wall of the cabin, an insulation protection 14 inserted between the wall and the casing 13, said casing 13 being preferably situated

2 beneath the normal porthole 12 of the cabin. In the embodiment of Fig. 2 the casing 13 has at its lower end a ventilation opening 15 towards the cabin, and at its upper end a ventilation opening 16 to the cabin directed upwards beneath the porthole 12 and suitably controlled by a damper or slide valve. Both these ventilation openings thus permit communication between the interior of the casing 13 and the cabin. Furthermore the casing 13 has near its top a ventilation opening 18 through the cabin wall for the intake of fresh air to the cabin preferably provided with a swingable shutter 17, the fresh air opening 18 being provided with a suitable protecting hood 19 against rain and water. The shutter 17 is swingable in such a way that in open position the fresh air stream is directed downwards into the casing 13. Within the casing 13 and in front of the lower opening 15 a reversible electrically driven fan 20 is mounted and a heat exchanger in the shape of a ribbed radiator 21 is placed behind and above the fan 20, said radiator 21 being connected by valve-provided pipes to the circulation piping 8. An outlet 22 for condensed water is situated in the lower portion of the casing.

By the above-described arrangements, it is possible to effect variable running of the plant in accordance with different weather and other conditions. Thus the device can be utilized in a tropic climate as well as in an arctic climate and in all places wherever the ship may travel. Further individual control of air exchange and air temperature can be effected in each cabin as desired.

If the cabin is to be heated in cool weather the circulation piping 8 is connected with the hot water boiler 6 via the circulation pump 7, so that warm water is caused to circulate through the radiator 21 and the radiator 21 will then serve as a heat radiator. The fan 20 may be started to rotate in such a direction that the air from the cabin is sucked into casing 13 through the lower opening 15, driven upwards to pass the radiator 21 and pass out of the casing 13 through the upper outlet 16 and back into the cabin. Circulation and heating of the air of the cabin are thus obtained. Obviously the air stream can also be given the opposite direction.

If the cabin is to be cooled when the ship is in tropic seas the water cooler 5 of the refrigerator 4 is, through the pump 7, connected with the circulation piping 8. The radiator 21 in the ventilation casing 13 now serves as a cooler and the air passing through the casing 13, in the same way as described above, is cooled thus cooling the cabin.

In use of fresh air to be heated or cooled the intake shutter 17 is opened and the opening 16 shut. The fan is started to rotate in such a direction that the air stream passes through the radiator 21 in a downward direction and enters the cabin heated or cooled. If a mixture of fresh air and cabin air is desired both the upper openings 16 and 18 may be opened more or less. If for instance in a tropic climate the cabin window 12 is opened fresh air from this window will also pass through the ventilation casing 13, as this casing 13 is positioned beneath said window 12.

On the other hand the cabin air may be driven upwards through the casing 13 when the cabin window 12 is opened whereby a downdraft of cool air is prevented.

Naturally ventilation with pure fresh air also may be obtained. In this case both the cabin window 12 and the fresh air intake 18 are opened and the top opening 16 as well as the radiator are shut off. The fan may drive the air-stream in either direction.

In the embodiment shown in Figs. 3 and 4 the ventilation casing 13 is as before provided with an electrically driven fan 20 and with a radiator 21 but in this embodiment the fan 20 is placed above the radiator 21 and the lower opening 15 and the upper opening 16 are both situated in the vertical front wall of the casing 13. Beneath the radiator 21 there are also inlet ports **23*a*, 23*b* for fresh air. For introducing this fresh air, the ventilation casing 13 is near the top in the back wall provided with a fresh air intake 18, the fresh air entering an upper chamber 24, the bottom 25 of which is inclined in such a way that the air-heated or -cooled within the casing 13 is guided out through the outlet opening 16 into the cabin. The chamber 24 is provided with two side discharge ports 25*a*, 25*b* communicating with downdirected side ducts 26, 27 in the casing the inlet ports 23*a*, 23*b* forming communications between said ducts and a rear chamber 28 in the lower portion of the casing 13 said chamber 28 being situated opposite the air opening 15 and a corresponding air intake chamber 29 for the air from the cabin. The two chambers 28 and 29 are separated by a vertical wall 30. In the extension of this wall there is a swingable shutter 31 operable by some means such as a handle 31' on the shaft 31'' of the shutter plate 31 by which it is possible to alternately close the chambers 28, 29 from communication with the space above in the casing 13 containing the radiator 21**.

For heating fresh air in the casing 13 for the cabin the swingshutter 31 is positioned as shown in Fig. 3 with free communication between the chamber 28 and the casing space above. When the fan 20 has been started to rotate so that the air is driven upwards within the casing 13, fresh air enters through the intake 18 into the chamber 24, streams through the ducts 26, 27 downwards to the chamber 28, is sucked upwards to pass the radiator 21, is heated and then guided out through the upper outlet 16 to the cabin. If a mixture of fresh air and cabin air is desired within the ventilation casing 13, the swingshutter 31 can be moved to different positions according to the desired air proportions. If the radiator is fed with a cooled fluid instead of heated water the cabin air will be cooled off. If only the cabin air is to be cooled, the swingshutter 31 is moved to shut off the fresh air and the cabin air is driven through the ventilation casing 13 upwards or downwards according to the rotation direction of the fan, the motor of which is preferably reversible and controlled by a suitable switch 32. If only a small amount of heating or cooling is needed, the chimney effect of the vertical casing 13 can be utilized without the need of the fan suction. Said fan 20 is carried within the casing 13 by such supports that when the fan assembly is put into position the electrical connection is automatically effected thereby, providing for easy exchange of fan assembly should a defect arise.

On account of the shape of the upper chamber 24, it is possible to provide air connection openings as desired in the top or in the side walls. For instance the upper chamber 24 may, if desired, be provided with an opening **16*a* normally closed by a closure 16*b* to provide either for entrance of fresh air directly to the cabin or for connection to the normal cabin window or porthole 12 situated above or at the side of the ventilation casing. In this case said porthole may be built up as shown in Fig. 5 and consist of a ringshaped housing 33 inserted between the cabin wall and the normal ring flange of the porthole covered by the window glass 34 of the same as well as provided with a connection 35 to a pipe from casing 13**.

With a plant described above with a complete ventilation assembly in each cabin connected to a fresh air opening in said cabin and provided with means for heating and cooling the air, an effective air conditioning can be obtained in a simple and comparatively cheap way without any use of extensive and troublesome ducts for the air. A central ventilation plant with heating and cooling element for distributing the air to different cabins thus is avoided and therewith the risk that a defect may put the whole plant out of function. The use of a single circulation piping—if such single piping is desired—common for the heating and cooling fluids will also reduce the installation work.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A ventilation radiator for a ship's cabin comprising a vertical casing including a front and rear wall divided into a central vertical air-stream channel and a fresh air duct at each side thereof, said central air stream channel having upper and lower cabin ports at the top and bottom portions of said front wall communicating with the cabin, a slanting partition at the top end of said central channel to deflect air toward the upper cabin port and to provide an air intake chamber, a heat exchanger with connections for heating or cooling medium disposed in said channel for heating or cooling air passing therethrough, a fresh air intake in said rear wall of the casing communicating with said fresh air intake chamber, said chamber having a valved opening communicating directly with said cabin, said fresh air intake chamber having openings communicating with said fresh air ducts at the top thereof, said ducts being provided at their bottom ends with openings communicating with the lower end of said central channel, a vertical wall extending from the bottom of said channel to divide the lower portion of said channel into two open top chambers, one of said chambers being in communication with the lower cabin port and the other being in communication with said ducts, a single swingable shutter plate mounted on the top of said wall of such width as to selectively contact said front and rear walls and serving to adjust the flow of air between said lower cabin port and said fresh air ducts, and a reversible axial flow fan mounted in said central channel above said heat exchanger whereby the ventilation in the cabin may be regulated.

References Cited in the file of this patent

UNITED STATES PATENTS

| | | |
|---|---|---|
| 719,416 | Atlee | Feb. 3, 1903 |
| 1,315,766 | Feldman | Sept. 9, 1919 |
| 1,395,938 | Barducci | Nov. 1, 1921 |
| 1,493,497 | Otis | May 13, 1924 |
| 1,503,089 | Callahan | July 29, 1924 |
| 1,760,166 | Page | May 27, 1930 |
| 1,872,785 | Modine | Aug. 23, 1932 |
| 1,913,681 | Otis | June 13, 1933 |
| 2,038,347 | Cornell, Jr. | Apr. 21, 1936 |
| 2,050,824 | Atherton | Aug. 11, 1936 |
| 2,135,461 | Wooley | Nov. 1, 1938 |
| 2,139,262 | Euwer | Dec. 6, 1938 |
| 2,284,161 | McElgin | May 26, 1942 |
| 2,439,487 | Reilley | Apr. 13, 1948 |
| 2,492,757 | Meek | Dec. 27, 1949 |
| 2,554,633 | Orear | May 29, 1951 |

FOREIGN PATENTS

| | | |
|---|---|---|
| 165,129 | Great Britain | June 30, 1921 |